Feb. 22, 1966     P. A. LATHERS     3,236,556
MOVABLE SEAT FOR MOTOR VEHICLE

Filed July 19, 1963     2 Sheets-Sheet 1

INVENTOR
PAUL A. LATHERS
BY
*Barlow + Barlow*
ATTORNEYS

INVENTOR
PAUL A. LATHERS
BY
*Barlow & Barlow*
ATTORNEYS

## United States Patent Office 3,236,556
Patented Feb. 22, 1966

3,236,556
MOVABLE SEAT FOR MOTOR VEHICLE
Paul A. Lathers, North Scituate, R.I.
Filed July 19, 1963, Ser. No. 296,205
6 Claims. (Cl. 296—65)

This invention relates to the movement of a person over a floor area for access to work areas and more specifically to the movement of a person while in a seated position and thus one usable by invalids who cannot stand. While this invention may be used in a machine shop or most any work area having a supporting floor, it is illustrated in one adaptation as applied to a motor vehicle having a body of the enclosed type.

Motor vehicles of the small van type truck such as produced by Volkswagen, Ford and Chevrolet do not permit of one standing in the body of the truck with comfort because of the limited headroom and, consequently, work which usually requires standing cannot be done in such a truck.

One of the objects of this invention is the provision of means so that a small van type truck may be utilized for catering or a workshop or the like by providing for the comfort of a person usually engaged in operating the activity for which the truck is equipped.

More specifically an object of the invention is to provide a seat upon which a person may sit thus allowing the person ample headroom in any part of the truck when so seated and then providing for means so that this seat may be moved over the floor space of the truck so that the occupant of the seat may reach all benches, counters or the like which may be installed in the truck and further to permit the same seat to be used as a seat for driving the truck and as a convenient means of getting into or out of the truck.

Another object of this invention is to provide a seat which may be raised or lowered or swung to any position within the truck or outside the truck through the door thereof so that a handicapped person may enter or leave the truck or move while seated to any position in the truck for performing duties ordinarily connected with a machine shop, catering or other services with which the truck is equipped.

Another object of the invention is to provide a mechanical means by which a person seated within the seat may manipulate the seat to various positions.

With these and other objects in view, the invention consists of certain novel features of construction as will be more fully described and particularly pointed out in the appended claims.

In proceeding with this invention, I pivotally mount a rigid arm with a pivot axis of the arm at such a location on the floor of the truck that the seat which I am to support may be swung to such areas as I choose to reach while sitting in the seat. I then swivelly mount a member on the free, or swinging end, of the arm and by means of a pantograph linkage, I support a post in a vertical position upon which the seat may be pivotally mounted for lateral swinging. This pantograph linkage permits of the seat to be moved up and down or vertically without tilting the seat, and I provide some power means, such as a pump, and hydraulic cylinder for swinging these pantograph links to raise and lower the seat at the end of this swinging arm. By this arrangement, the seat may be swung out through doors in the side of the truck and lowered to a position so that a person may move from a wheelchair onto the seat and then by manipulation of the pump raise himself to a height so that he may swing himself into the truck and then maneuver the seat to any desired position in the truck including a location for driving the truck.

Figure 2:
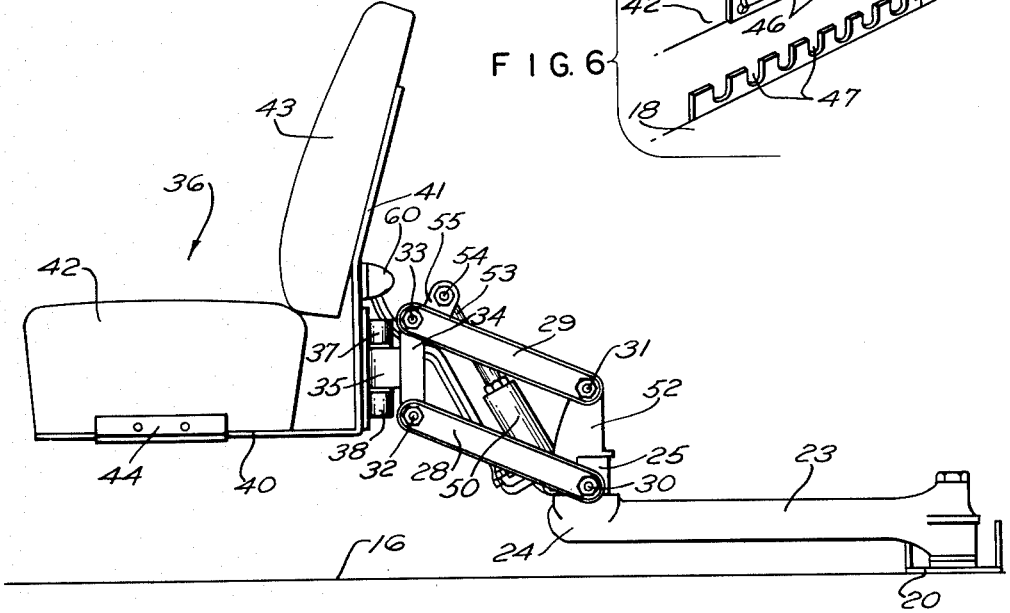
FIG. 2 is a side elevation of the seat and the parts which movably mount it.
Figure 3:
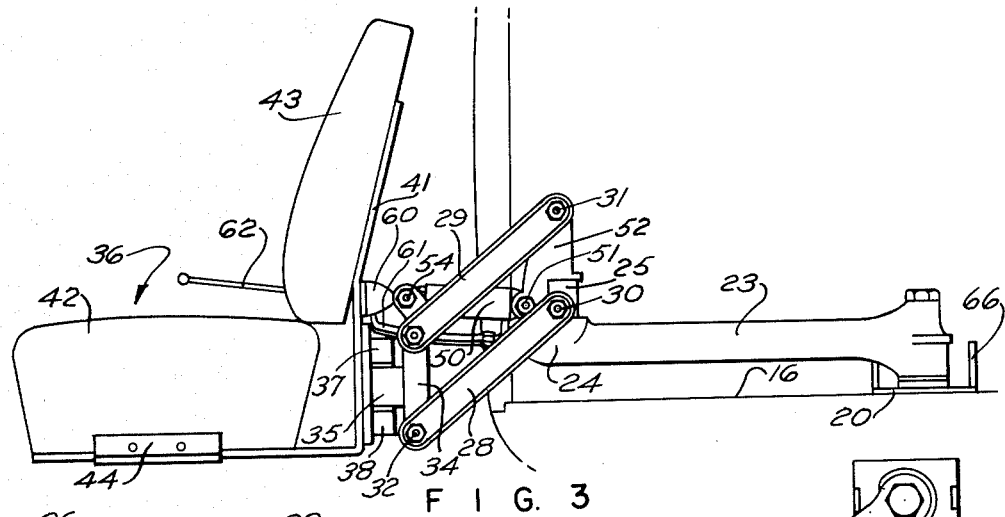
FIG. 3 is a view similar to FIG. 2 and illustrating parts of the truck with the seat extending out of the truck and lowered from the position shown in FIG. 2.
Figure 4:
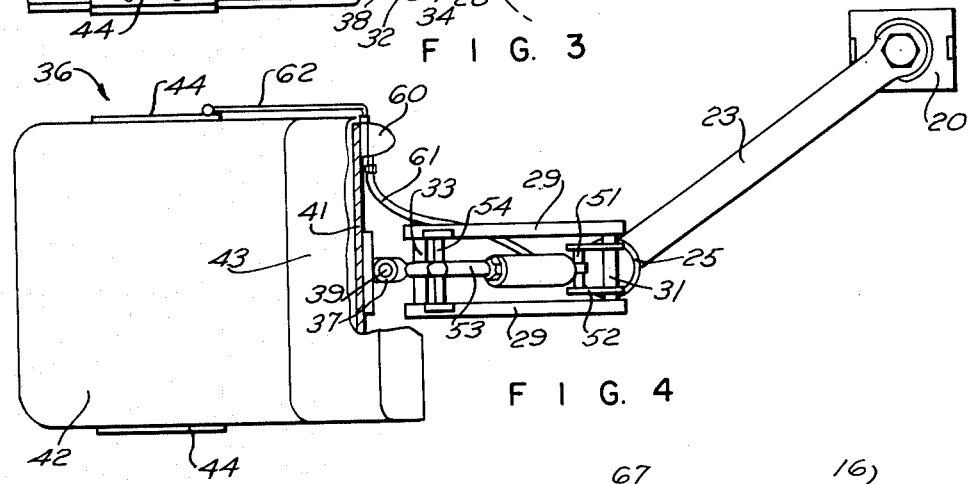
FIG. 4 is a top plan view partially broken away of the structure shown in FIG. 3.
Figure 5:
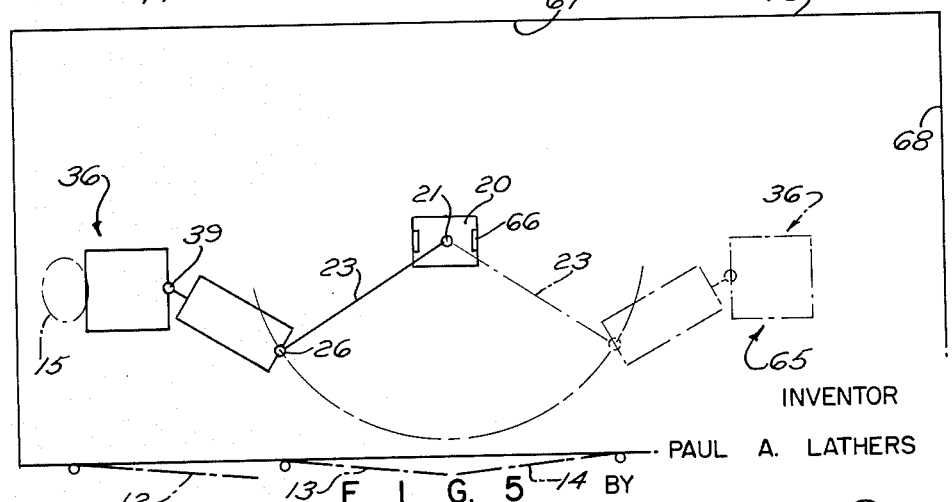
FIG. 5 is a schematic view illustrating the various positions to which the seat may be moved over the floor of the truck.

With reference to the drawings, 10 designates generally a small van type truck such as produced by Volkswagen, Ford or Chevrolet and which has a rather large enclosed area with a fixed top 11, front door 12, side doors 13 and 14, steering wheel 15, and floor area 16 shown in FIGS. 2, 3 and 5. The front wheel is designated generally 17 and the mudguard 18 over the wheel.

Upon the floor 16 of the truck there is mounted a pedestal 20 with a pivot pin 21 extending vertically upwardly therefrom and upon this pivot pin or pivotal axis 21 a rigid arm 23 is swingably mountd. This pedestal is conveniently located on the floor area 16 so that all parts of the truck may be reached. In FIG. 5 it will be noted that the pedestal is located substantially centrally of the area 16 although this exact location is not important. On the outer end 24 of this arm 23 there is swivelly mounted a member 25 which is so pivoted with relation to the arm 23 that it may move through 360 degrees. Its pivot axis 26 in the schematic view shown in FIG. 5 is parallel to the axis of the pivot 21. This member has spaced plates 52 which extend generally upwardly.

Links 28 and 29 extend from each side of the plates 52 and are pivoted thereon as at 30 and 31 in the plane of the axis of pivot 26 and are similarly pivoted as at 32 and 33 to a post 34 and by reason of the distance between the pivots 31, 33 and 30, 32 being equal, this post 34 is supported in a position parallel to the pivot axis 26 of the member 25. By this arrangement, a pantograph support is provided for the post 34 so that as the links swing, the post will be moved vertically with its axis always parallel to the axis 26. The post 34 carries an ear 35 to swingably support a seat 36 by means of spaced ears 37 and 38 aligning with the ear 35 and receiving a pivot pin 39 therethrough thus swingably mounting the seat on a vertical axis upon this post for swinging movement through substantially 120 degrees about the axis of the pin 39.

Figure 1:
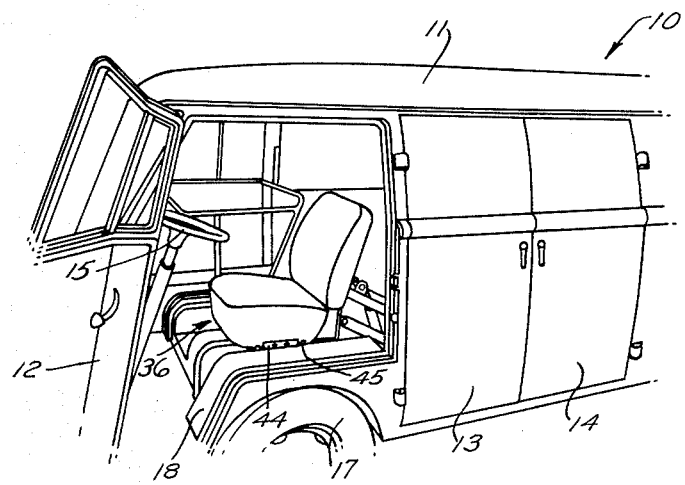
FIG. 1 is a fragmental perspective view of a small van truck of the Volkswagen type with the front door thereof open and illustrating the seat of this invention in a position for driving the truck.
Figure 6:
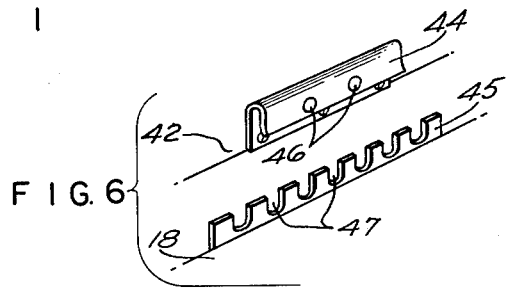
FIG. 6 is a perspective view of a means for locking the seat in the driving position.

The seat 36 comprises a base 40 and back 41 with a seat cushion 42 and a back cushion 43 supported thereby. A locking means comprising inverted U-shaped yokes 44 with spaced pins 46 is located on either side of the base 40 (see FIG. 6) which pins 46 may fit into selected notches 47 in bar 45 by lowering the seat so as to firmly secure the seat in the driver's station position when the seat is to be used for the operation of the motor vehicle.

In order to elevate the seat, I have provided a hydraulic cylinder 50 which is pivotally secured as at 51 to plates 52 extending from the swivel member 25 a piston is located within this cylinder and a piston rod 53 extends outwardly from the upper end of the cylinder and is connected to a pin 54 which extends through ears 55 projecting at generally right angles to the upper links 29 thus by forcing the piston and the piston rod 53 upwardly there will be movement of the pivots 32 and 33 of the links 29 upwardly and thus raise the seat. In order to force liquid into the lower end of the piston 50, I have provided a pump 60 with a flexible hose 61 extending from the pump to the lower end of the cylinder 50 so that actuation of the pump by means of a handle 62 will force liquid from the pump through the hose 61 to the lower end of the cylinder so as to elevate the seat. When it is desired to lower the seat, it is merely necessary to lift on the handle which opens a valve within the pump permitting the liquid to move back into the pump from the cylinder 50 or into some suitable reservoir connected with the pump and the weight of the seat will move the piston and the rod 53 downwardly lowering the seat.

Assuming that the seat has been swung through the side doors 13 and 14 of the truck and is lower than the floor of the truck as shown in FIG. 3, a person may easily seat himself upon the seat while it is out of the truck then by manipulation of the handle 62 the person in the seat may elevate himself to the position of the seat similar to that shown in FIG. 2 and he may then swing himself into the truck by swinging the links and arm 23 about his pivot 21. Should he care to move to the driver's position, the link 23 will be swung forwardly to the full line position shown in FIG. 5 with the link angles substantially as shown in FIG. 5 to bring the seat 36 to a position near the steering wheel 15 as shown in FIG. 5 and here he may lock the seat in position if driving is desired by lowering the seat into racks 45.

In the event it is desired that he move from this position of driving to some other position in the truck, it is merely necessary to raise the seat and then by either means of his feet or hands, he may swing the seat on the pivots 26 and 39 so as to reach substantially any other location in the truck which is desired such as is shown in dotted lines at 65 in FIG. 5. Suitable stops 66 may be positioned on the pedestal so as to limit the movement of the arm when it is found just how far it is desired that this arm should swing in order to reach the various parts of the truck desired. Counters may be placed along the wall 67 and 68 or workbenches or whatever may be needed for work operation desired in the truck.

It will be clear that while I have shown the invention as applied to a truck that the pedestal 20 may be mounted on the floor of a building housing working machines so that a person in a seated position may move over an extended area for access to his work at the machines.

I claim:

1. An enclosed motor vehicle having a floor, a seat, means to mount said seat for movement over the floor to provide the occupant of the seat access to all areas over the floor of the vehicle, said means comprising an arm, means for mounting said arm on said floor for pivoting about a vertical axis, and a means for mounting said seat for pivoting about a second vertical axis, a vertical pivot adjacent the end of said arm, and means attached to said vertical pivot and the means for mounting the seat for bodily vertically adjusting the means for mounting the seat and swinging the second axis bodily over the arm and bodily beyond the end of the arm.

2. A movable seat for a work area having a floor comprising a rigid arm, means for mounting said arm on said floor for pivoting about a vertical axis to swing horizontally and generally parallel to said floor, a swivel member, means for pivoting said member on the outer end of said arm to swing about a vertical axis generally parallel to the pivot axis of said arm, parallel links extending from said member, a supporting post connecting the outer ends of said links, said links being pivoted to said member and post at their respective ends and holding said post generally vertically, a seat pivoted on said post and power means to swing said links relative to said member to effect raising and lowering of said seat.

3. An enclosed motor vehicle having a side door and a floor, a rigid arm, means mounting said arm on said floor for pivoting about a vertical axis, said arm being of a length and so pivoted that its outer end will swing closely adjacent the edge of the floor at said open door, a swivel member, means for pivoting said member on the outer end of said arm to swing about a vertical axis generally parallel to the pivot axis of said arm, parallel links extending from said member, a supporting post connecting the outer ends of said links, said links being pivoted to said member and post at their respective ends and holding said post generally vertically, a seat pivoted on said post and power means to swing said links relative to said member to effect moving of said seat outside of the door to a position below the level of the floor.

4. A movable seat as in claim 2 wherein the pivot of said member is such that said member has movement of 360 degrees about the pivoted axis at the outer end of said arm.

5. A movable seat as in claim 2 wherein means limits the pivoted movement of said arm on its pivoting means to the floor.

6. A movable seat for a work area having a floor comprising a rigid arm, means for mounting said arm on said floor for pivoting about a vertical axis to swing horizontally and generally parallel to said floor, a supporting post, a seat, means to mount said seat on said post to swing about a pivot whose axis extends generally vertically to said floor and parallel to the axis of the pivot for said arm, a swivel member mounted on the outer end of the arm to pivot about an axis generally parallel to said pivotal axes, parallel links of substantially equal length connecting said post and member for vertical movement of the post and power means for effecting such vertical movement.

References Cited by the Examiner

UNITED STATES PATENTS

| 1,143,195 | 6/1915 | Henderson | 296—64 |
| 2,254,678 | 9/1941 | Frise | 297—347 X |
| 2,697,475 | 12/1954 | Dueth | 297—347 X |
| 2,700,411 | 1/1955 | Lamb | 296—65 X |
| 3,131,964 | 5/1964 | Reed | 297—349 |

FOREIGN PATENTS

| 1,102,100 | 5/1955 | France. |

BENJAMIN HERSH, *Primary Examiner.*

LEO FRIAGLIA, A. HARRY LEVY, *Examiners.*